United States Patent [19]

Kingsbury

[11] Patent Number: 5,021,911
[45] Date of Patent: Jun. 4, 1991

[54] CLEANING CASSETTE

[75] Inventor: Philip C. O. Kingsbury, Wargrave, United Kingdom

[73] Assignee: Automation Facilities Limited, Berkshire, United Kingdom

[21] Appl. No.: 457,693

[22] PCT Filed: Jun. 23, 1988

[86] PCT No.: PCT/GB88/00483

§ 371 Date: Dec. 21, 1989

§ 102(e) Date: Dec. 21, 1989

[87] PCT Pub. No.: WO88/10496

PCT Pub. Date: Dec. 29, 1988

[30] Foreign Application Priority Data

Jun. 23, 1987 [GB] United Kingdom ............... 8714668

[51] Int. Cl.⁵ .................... G11B 5/10; G11B 5/127
[52] U.S. Cl. ........................... 360/128; 360/137; 15/DIG. 12
[58] Field of Search .................. 360/128, 137; 15/DIG. 12

[56] References Cited

U.S. PATENT DOCUMENTS 4,107,810 8/1978 Varni et al. .
4,141,053 2/1979 Kara .
4,272,796 6/1981 Van Kreuningen et al. .
4,490,767 12/1984 Neuman et al. .
4,631,614 12/1986 Davis et al. .

FOREIGN PATENT DOCUMENTS 198318 10/1986 European Pat. Off. .
262620 4/1988 European Pat. Off. .
3300418 7/1983 Fed. Rep. of Germany .
2000623 1/1979 United Kingdom .
2185344 7/1987 United Kingdom .
193367 9/1986 European Pat. Off. .
287689 10/1988 European Pat. Off. .

OTHER PUBLICATIONS

Abstract of Japanese Ref. No. 58-100254 (in English).
Abstract of Japanese Ref. No. 59-60727 (in English).

*Primary Examiner*—John H. Wolff
*Assistant Examiner*—Jefferson Evans
*Attorney, Agent, or Firm*—Flynn, Thiel, Boutell & Tanis

[57] ABSTRACT

A cleaning cassette for cleaning the heads of streamer tape drives has a wiper arm (14) carrying a foam wiping pad (40) at one end and pivoted in the casing (12) at the other. A pick-up wheel (60) engages the capstan of the drive and reciprocates the wiper arm, through gear wheels (62,26) and a crank arm (30), to cause arcuate movement of the pad across the head. The pad has a thicker central portion (44) and thinner wings (46), and a metal base strip (42) is compressed over the wings. Effective head cleaning is achieved in a simple and practical structure without excessive head wear.

12 Claims, 3 Drawing Sheets

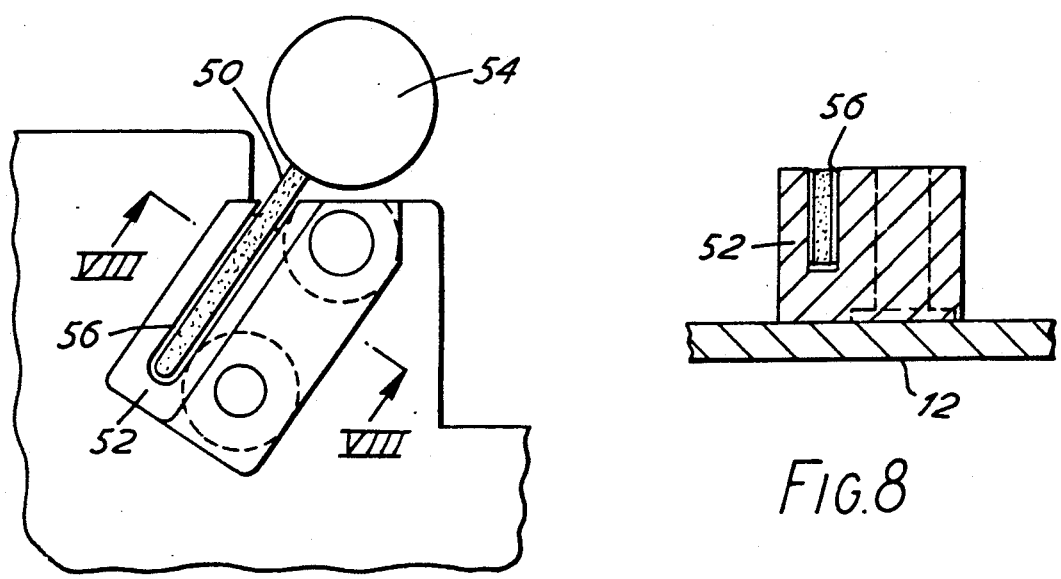
FIG. 7
FIG. 8
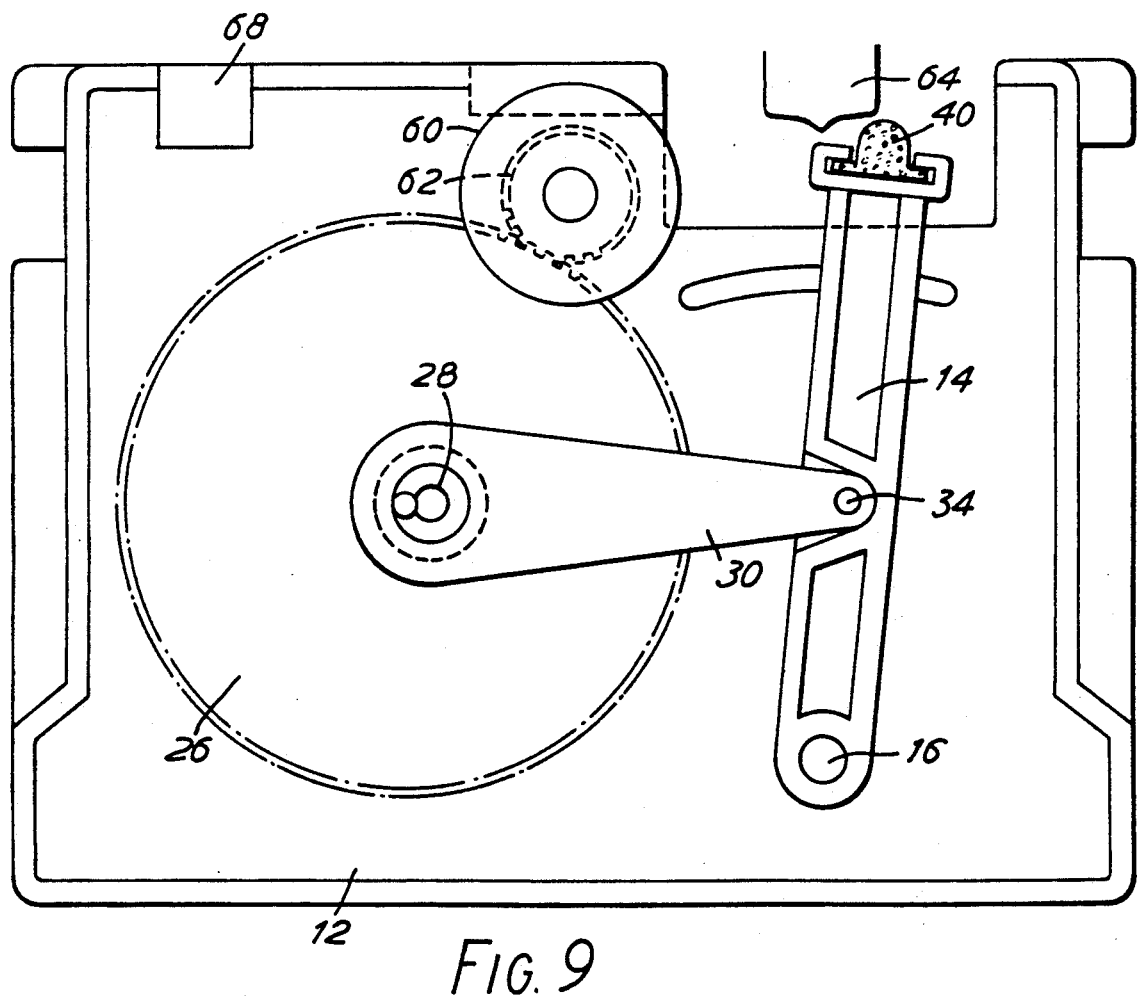
FIG. 9

CLEANING CASSETTE

BACKGROUND OF THE INVENTION

The present invention provides an apparatus for cleaning the record/playback head of a cassette drive device such as a magnetic tape drive device, the apparatus having a casing in the form of a cassette which may be inserted into the cassette drive device.

The invention is particularly concerned with streamer tape drives, as used for back-up purposes in computer installations. U.S. Pat. No. 4,631,614 discloses in FIG. 6 a cleaner for the heads of a streamer tape drive in which a complex drive train transmits drive to a rocking cleaning head which wipes a pad across the heads in a direction transverse to the direction of tape movement (or the longitudinal extent of the tape). Other head cleaning proposals include European Patent Application No. 0 188 655 which is a purely manual streamer tape drive head cleaning system, and U.S. Pat. Nos. 4,442,468; 4,149,206 and 3,955,214 which describe cleaners for audio tape cassette drives of well-known type in which a cleaning means is driven from the usual sprocket or hub of the cassette. We have found that none of these systems are satisfactory for streamer tape drives in providing sufficient cleaning action without causing undue wear on the heads.

SUMMARY OF THE INVENTION

The present invention is defined in the appended claims to which reference should now be made for a definition thereof.

A particularly preferred example of the invention takes the form of a cleaning cassette having a casing and containing a wiper arm pivoted in the casing at one end and at the other end carrying a replaceable wiper pad assembly which follows an arcuate path on pivotal movement of the wiper arm. The wiper arm is driven from the capstan drive wheel of the drive the heads of which are being cleaned through a pick-up wheel which contacts the capstan drive wheel when the cleaning cassette is in use. The pick-up wheel drives a large wheel through toothed gearing and a crank arm is eccentrically pivoted by one end on the large wheel. The other end of the crank arm is attached to the wiper arm to drive the same.

The replaceable wiper pad assembly is slidable into a T-socket on the wiper arm and includes a pad having a thicker central portion and opposed thinner planar wings. A metal base plate is crimped over the wings.

It is an advantage of the head cleaning cassette of the present invention that it can be loaded into a magnetic tape drive device in the same way as a magnetic tape cassette is loaded. A further advantage is that the cassette is operated by the tape drive to simply and effectively clean the head.

BRIEF DESCRIPTION OF THE DRAWINGS

Cleaning cassettes embodying the invention will now be described in detail, by way of example only, with reference to the accompanying drawings, in which:

FIG. 7 is a detail view showing a capstan cleaning pad;

FIG 8 is a section taken on line VIII—VIII in FIG. 7; and

FIG. 9 is a view similar to FIG. 1 of a slightly modified head cleaning cassette.

DETAILED DESCRIPTION OF THE PREFERRED EMBODIMENTS

Figure 1:
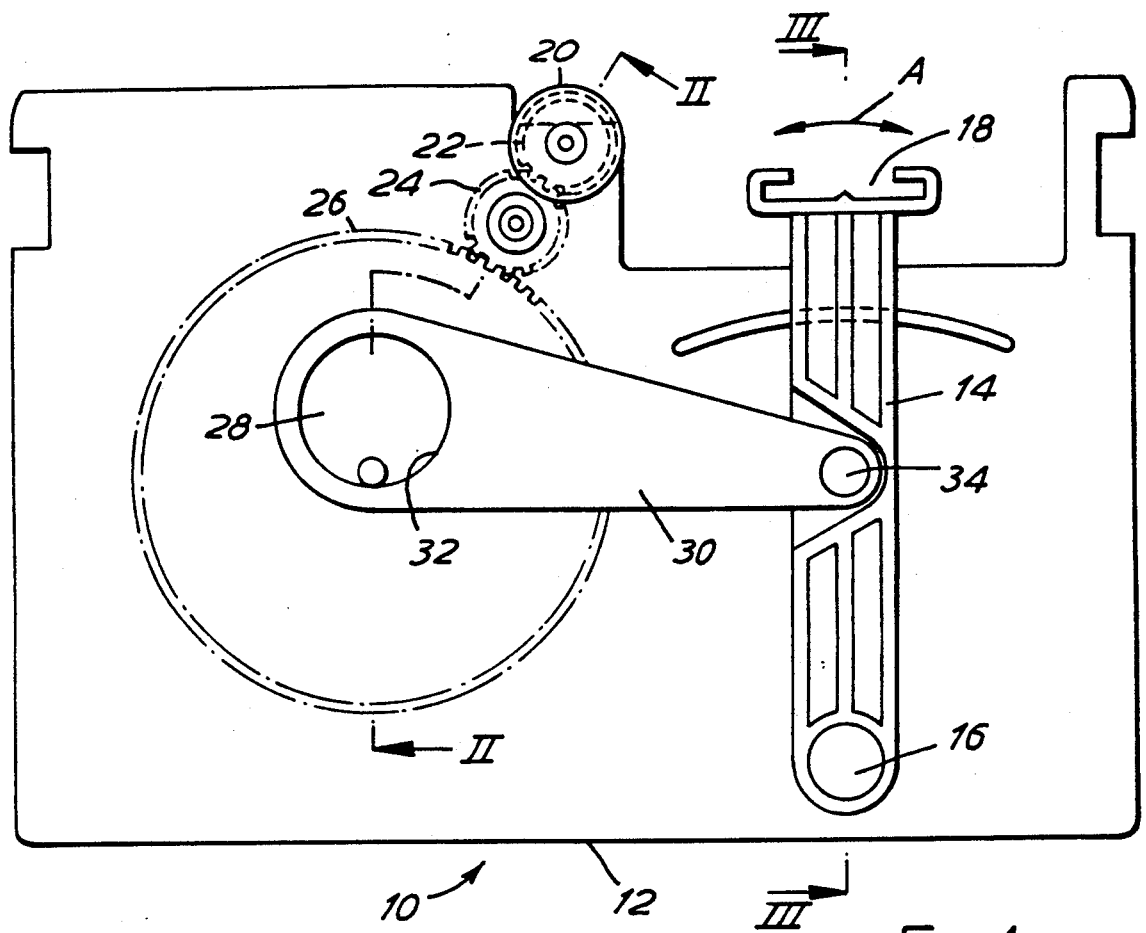
FIG. 1 is a schematic plan view of a cleaning cassette in accordance with this invention.
Figure 2:
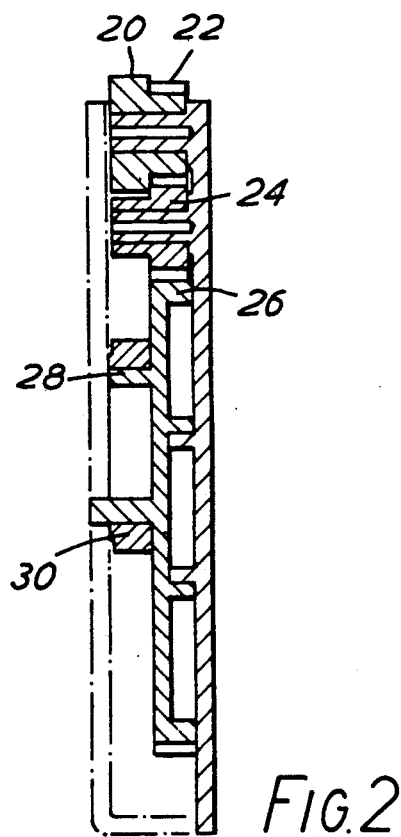
FIG. 2 is a sectional view taken on the line II—II in FIG. 1 showing the gear drive.
Figure 3:
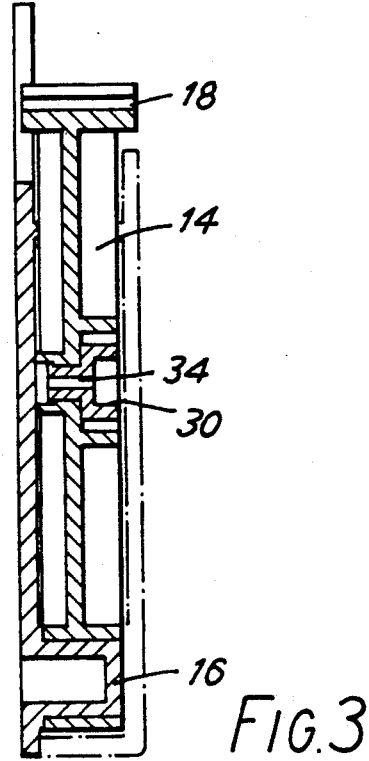
FIG. 3 is a sectional view taken on the line III—III in FIG. 1 showing the wiper arm.

As shown in FIGS. 1 to 3, the cleaning cassette 10 has a casing 12 designed to be suitable for loading into a magnetic tape drive device or "streamer" tape such as commonly used for back-up purposes in computer installations. As the external shape of the casing 12 is of standard type, it is not described here in detail; it will be seen that it has a thickness substantially less than its width and length to present a generally planar configuration. A typical size is approximately 150 mm by 100 mm by 16 mm. The casing houses a wiper arm 14 movable in the plane of the casing about a pivot 16 formed on the casing. The head end remote from the pivot 16 is formed with a T-slot 18 to receive a wiper pad, as described below.

To provide drive to the wiper arm, a pick-up wheel 20 frictionally engages with the capstan drive wheel (not shown) of a cassette tape drive in conventional manner. The pick-up wheel 20 is mounted coaxially with a first toothed gear 22 which engages an idler gear 24 which in turn engages a larger gear 26. The large gear 26 operates as a cam wheel and to that end has an eccentric bush boss or 28 on its upper surface over which is mounted a crank arm 30 with a corresponding aperture 32 at one end. The crank arm 30 is linked to the middle portion of the wiper arm at its other end by a rivet portion 34.

In use, the cassette is loaded into a magnetic tape drive device in the normal way. When the tape drive is started, the capstan drive wheel drives the pick-up wheel 20 which rotates the cam wheel 26 through the gear train 22,24. The gear train provides a reduction of between 2:1 and 10:1, preferably around 5:1. The rotation of the cam wheel 26 then causes the crank arm 30 to reciprocate the wiper arm 14 so that the head end of the wiper arm carrying the wiper pad moves back and forth across the head to be cleaned, generally in the direction of tape movement, namely as shown by the double headed arrow A.

The toothed gear drive could be replaced by a frictional drive coupling as an alternative.

The arcuate path for the cleaning head has the advantage that maximum cleaning pressure is applied to clean the drive head over its central region where the build-up of dirt may be greatest. This we have found to be particularly effective in removing contaminant while tending to minimise wear on the heads. The cassette illustrated thus provides a self-contained automatic head cleaning apparatus in a simple and compact form. Provision may be made in the casing for the introduction of a cleaning solvent to improve the cleaning efficiency of the pad(s).

It should be noted that the cassette is simple to make and that the bushings and mountings for the various components are made by appropriate shaping of the base and top plates as shown.

Figure 5:
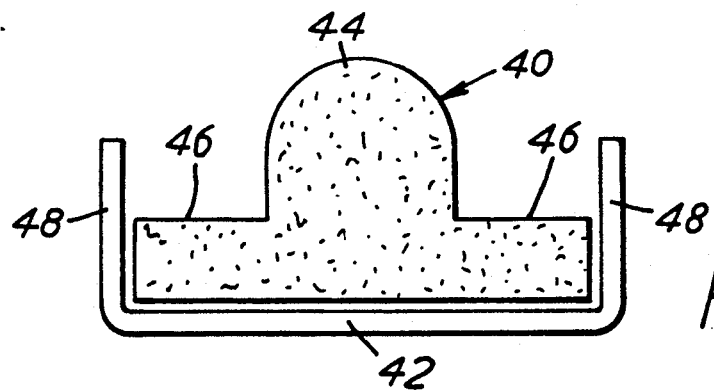
FIG. 5 shows the wiper head in a partially-assembled condition.
Figure 6:
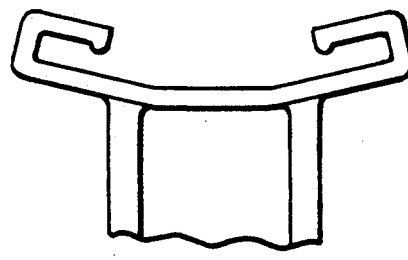
FIG. 6 is a view similar to FIG. 4 of a possible modification of the wiper head.

The cleaning pad assembly will now be described with reference to FIGS. 4 and 5. The pad assembly comprises a pre-formed foam element 40 and an aluminum strip 42. As shown in FIG. 5, the preshaped foam elements has a solid thicker central portion 44 and two thinner wings 46. The aluminium strip forms a base for the pad and has two flanges 48 which are folded over to compress the wings 46 and thereby secure the foam element 40. The aluminium base can then be slid only the T-slot 18 at the top of the wiper arm 14. The pad is thus easily replaceable when it becomes soiled. In a modification of the head 18 as shown in FIG. 6, the head is curved and receives a correspondingly curved pad assembly.

Figure 4:
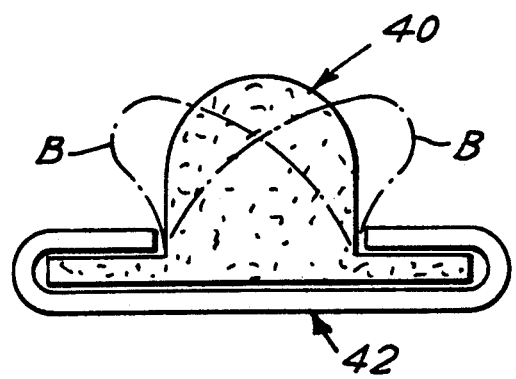
FIG. 4 is a view of the wiper head.

The foam pad 40 is shaped so that as it passes across the head it can distort sideways as shown by the dashed lines B in FIG. 4. This we have found to be particularly effective in achieving good cleaning without undue wear on the heads, especially when considered together with the arcuate path transversed by the pad.

Other advantageous features may be added to the cassette described above. For example, it may be desirable to include in the casing a static pad arranged to come into contact with the capstan drive wheel so as to provide a cleaning action as the capstan rotates. Such a static foam pad 50 is shown in FIG. 7 and 8 and is mounted in a moulding 52 in the casing so as to project against the surface of the capstan drive wheel 54. The pad 50 is held in a U-shaped aluminum strip retained in a slot 56 in the moulding 52.

The modification of FIG. 9 is similar in principle to the cleaner of FIG. 1 and will not therefore be described again in detail. In this case however the idler gear 24 is omitted. The pick-up wheel 60 is larger than the pick-up wheel 20 and frictionally engages with the capstan drive wheel. The pick-up wheel 60 is mounted coaxially with a toothed gear 62 which engages directly with the gear 26. As with FIG. 1, rotation of the pick-up wheel is converted to arcuate reciprocation of the wiper pad 40 against the head 64 to be cleaned, the reciprocation being in the direction parallel to the direction of movement of the tape in a standard cassette. The overall size of the casing 12 in this case is approximately 80 mm by 60 mm.

Certain drives have photocell/lamp combinations to detect the beginning and end of tape of a standard cassette. It may be necessary to include one or more opaquing plates 68 in the cleaning cassette located to interrupt the light from the lamp so that it does not reach the photocell. Otherwise the tape drive may switch off automatically, as it apparently senses that the end of tape has been reached.

Many modifications may be made to the arrangements illustrated within the scope of the invention as defined in the following claims.

I claim:

1. A cleaning cassette for cleaning a record/playback head of a cassette drive device, said cassette comprising:
   a casing having a thickness substantially less than its width, said casing presenting a generally planar configuration;
   a head wiping element;
   a wiper arm having first and second ends, said first end of said wiper arm being supported in said casing by pivotal support means for angular movement of said wiper arm about a first axis perpendicular to said generally planar configuration, said second end of said wiper arm carrying said head wiper element for arcuate movement in a direction of tape travel;
   a pick-up wheel having means for facilitating rotational driving of said pick-up wheel by a capstan drive wheel of a cassette drive device, said pick-up wheel being supported in said cassette for rotation about a second axis generally parallel to said first axis;
   a further wheel supported in said cassette for rotation about a third axis generally parallel to said second axis and having an eccentric portion;
   coupling means for interconnecting said pick-up and further wheels so that rotation of said pick-up wheel causes rotation of said further wheel; and
   a crank link having a first end pivotally supported on said eccentric portion of said further wheel, and having a second end pivotally supported on said wiper arm at a position between said first and second ends of said wiper arm.

2. A cassette according to claim 1, wherein said eccentric portion of said further wheel is an eccentric boss, and wherein said first end of said crank link has an aperture which recieves said eccentric boss on said further wheel.

3. A cassette according to claim 1, wherein said coupling means provides a reduction ratio between said pick-up wheel and said further wheel which is in excess of 2:1.

4. A cassette according to claim 3, wherein said reduction ratio is about 5:1.

5. A cassette according to claim 1, wherein said coupling means including said further wheel having a toothed gear portion, and includes a toothed gear coaxially mounted with said pick-up wheel in said casing.

6. A cassette according to claim 5, wherein said coupling means including an idler gear engaged with said toothed gear and with said toothed gear portion of said further wheel.

7. A cassette according to claim 1, including a static pad located to contact a capstan drive wheel of a cassette drive device so as to provide a cleaning action as the capstan drive wheel rotates.

8. A cassette according to claim 1, including opaquing means on the casing located to interrupt a light path between a lamp and a photocell of a tape detector in a drive.

9. A cassette according to claim 1, wherein said wiper element includes a foam pad having a thick central portion and two opposed thinner wings, and includes a metal base strip having flanges bent over and compressing the wings to secure the pad thereto.

10. A cleaning cassette for cleaning the record/playback head of a cassette drive device, comprising a casing having a thickness substantially less than its width to present a generally planar configuration; a wiper arm which has first and second ends, which is pivotally mounted at the first end within the casing so as to be movable in the plane of the casing, and which carries a wiping element at the second end for arcuate movement across a drive head; a pick-up wheel supported in the cassette to engage a capstan drive wheel of a drive; and means for drivingly coupling the pick-up wheel to the wiper arm so as to reciprocate the wiper arm in response to rotation of the pick-up wheel, the reciprocation of the wiper arm causing the wiping element to move generally in a direction of tape movement across the head; in which the coupling means includes a crank arm having first and second ends and includes a second wheel driven from the pick-up wheel, the second wheel having an eccentric pivot mounting which is engaged by the first end of the crank arm, the second end of the crank arm being pivotally coupled to an intermediate portion of the wiper arm; and in which the coupling means provides a reduction ratio between the pick-up wheel and the second wheel in excess of 2:1.

11. A cassette according to claim 10, in which the reduction ratio is about 5:1.

12. A cleaning cassette for cleaning the record/-playback head of a cassette drive device, comprising a casing having a thickness substantially less than its width to present a generally planar configuration; a wiper arm which has first and second ends, which is pivotally mounted at the first end within the casing so as to be movable in the planar of the casing, and which carries a wiping element at the second end for arcuate movement across a drive head; a pick-up wheel supported in the cassette to engage a capstan drive wheel of a drive; and means for drivingly coupling the pick-up wheel to the wiper arm so as to reciprocate the wiper arm in response to rotation of the pick-up wheel, the reciprocation of the wiper arm causing the wiping element to move generally in a direction of tape movement across the head; in which the coupling means includes a crank arm having first and second ends and includes a second wheel driven from the pick-up wheel, the second wheel having an eccentric pivot mounting which is engaged by the first end of the crank arm, the second end of the crank arm being pivotally coupled to an intermediate portion of the wiper arm; in which the second wheel has a toothed gear portion, the coupling means includes a toothed gear coaxially mounted with the pick-up wheel in the casing, and in which the coupling means includes an idler gear engaged between the toothed gear and the toothed gear portion of the second wheel.

* * * * *

UNITED STATES PATENT AND TRADEMARK OFFICE
CERTIFICATE OF CORRECTION

PATENT NO. : 5,021,911

DATED : June 4, 1991

INVENTOR(S) : Philip C. O. KINGSBURY

It is certified that error appears in the above-identified patent and that said Letters Patent is hereby corrected as shown below:

Column 4, line 34; replace "including" with ---includes---.

Column 4, line 38; replace "including" with ---includes---.

Column 5, line 19; replace "planar" with ---plane---.

Signed and Sealed this

Fifth Day of January, 1993

Attest:

DOUGLAS B. COMER

*Attesting Officer*      *Acting Commissioner of Patents and Trademarks*